July 8, 1941.   G. W. ELSEY   2,248,167
METHOD OF MAKING ROTORS
Original Filed June 15, 1936    4 Sheets-Sheet 1

Inventor
GEORGE W. ELSEY
By Spencer, Hardman and Fehr
Attorneys

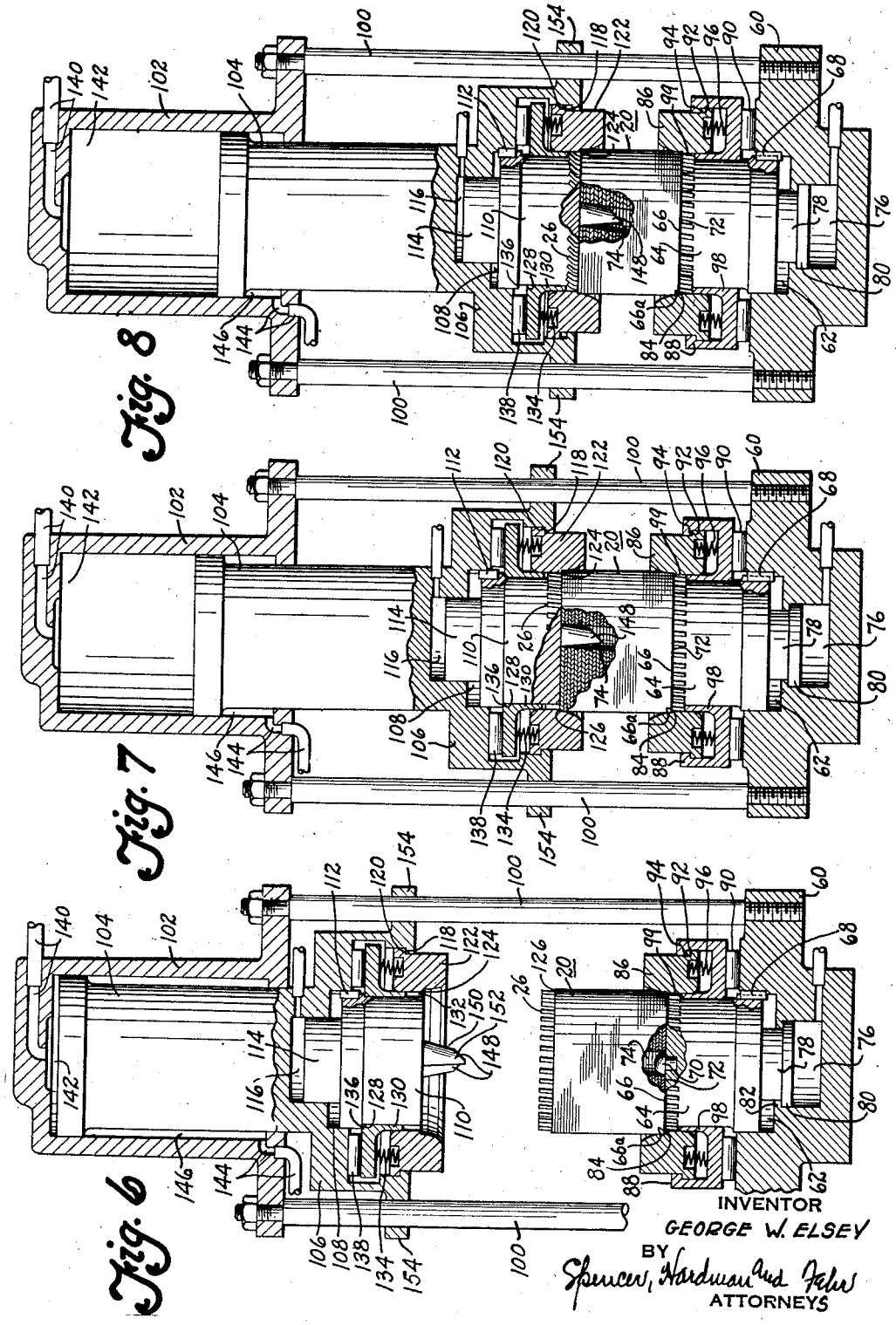

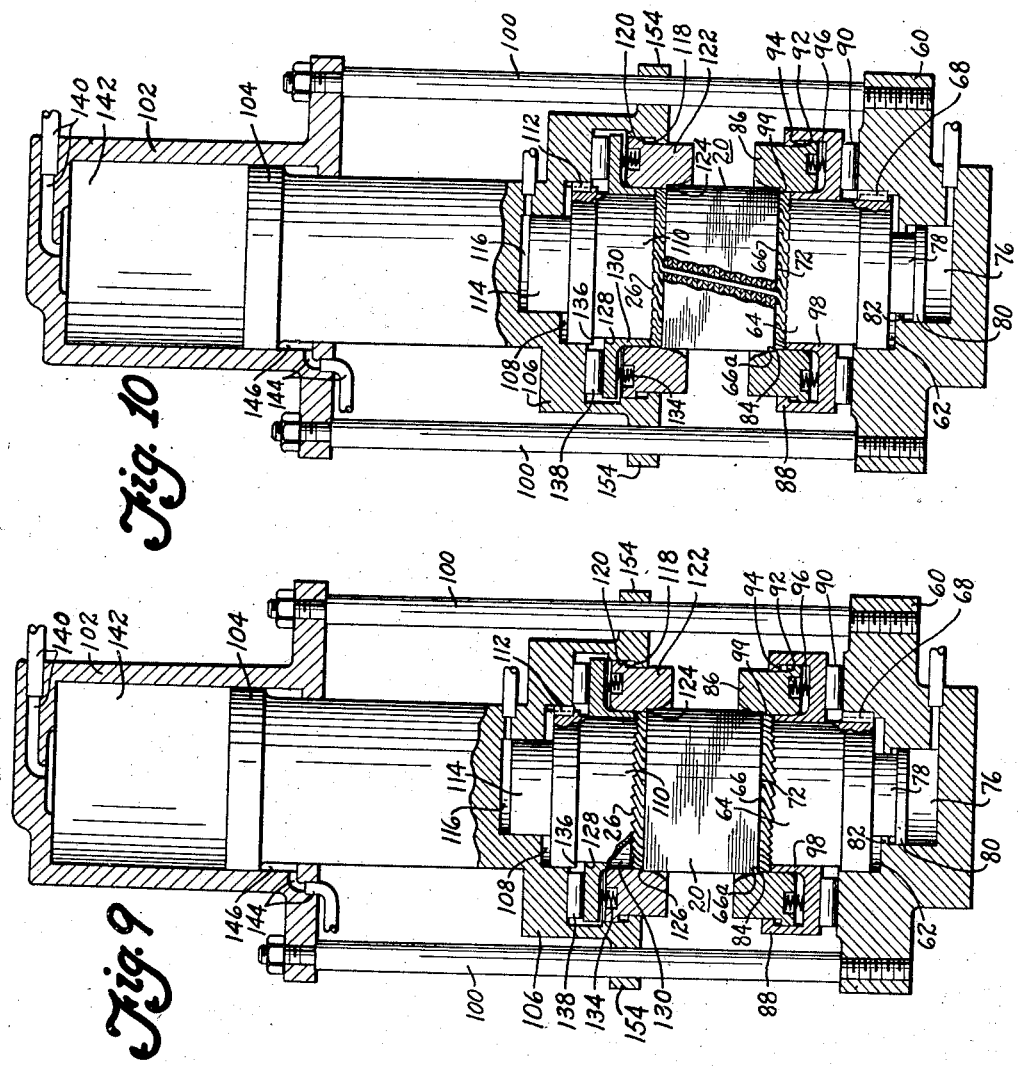

July 8, 1941.   G. W. ELSEY   2,248,167
METHOD OF MAKING ROTORS
Original Filed June 15, 1936   4 Sheets-Sheet 4

INVENTOR
GEORGE W. ELSEY
BY
Spencer, Hardman and Fehr
ATTORNEYS

Patented July 8, 1941

2,248,167

UNITED STATES PATENT OFFICE 2,248,167

METHOD OF MAKING ROTORS

George W. Elsey, Western Springs, Ill., assignor to General Motors Corporation, Detroit, Mich., a corporation of Delaware Application June 15, 1936, Serial No. 85,321
Renewed October 14, 1939

4 Claims. (Cl. 29—155.53)

This invention relates to dynamoelectric machines and more particularly to rotors for induction motors, generally known as squirrel cage rotors.

The aim and object of the present invention is to provide a rotor which will be strong in construction and which will have good electrical characteristics.

More particularly, it is an object of the invention to provide a rotor having a predetermined skew and comprising a laminated core carrying conductors which are integral with end rings formed by bending the protruding ends of the conductors against each other and against the ends of the core and fusing the contacting end portions of the conductors together to form solid rings from the material of the conductors.

To accomplish this object, I provide a novel method which comprises assembling the conductors with a laminated core with the conductor ends protruding beyond the ends of the core, then skewing the laminations a predetermined amount, and while maintaining the laminations in the predetermined skewed condition preferably by compressing the laminations while in skewed condition, bending the conductor ends against the core to hold the laminations permanently in the desired skewed condition. During the operation of fusing the conductor ends together to form conductor rings, the heat applied is so controlled that the swedged portions of the conductors nearest the ends of the core are not fused but remain operative to serve as rivet heads, thus holding the laminations in compacted, skewed condition while the outer portions of the rings are temporarily softened.

Further objects and advantages of the present invention will be apparent from the following description, reference being had to the accompanying drawings wherein a preferred embodiment of the present invention is clearly shown.

In the drawings:

Figs. 1 to 5 inclusive, disclose progressive stages of development in the manufacture of rotors for dynamoelectric machines.

Figs. 6 to 10 inclusive, are diagrammatic, sectional illustrations of certain cooperating machine structure which may be used in the manufacture of rotors. These figures show progressive stages of the operation of the machine structure on a rotor.

Figs. 11 to 15, inclusive, illustrate diagrammatically the cooperation of certain elements of said machine structure and its effect upon the conductors of the rotor.

Figure 1:
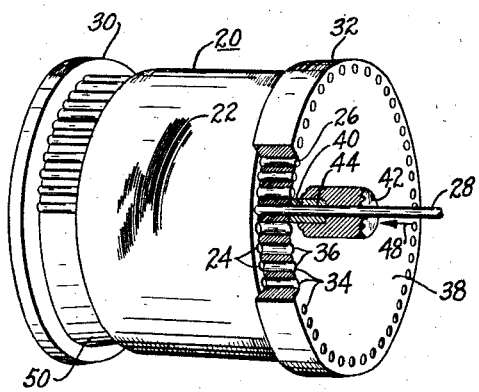
Figure 2:
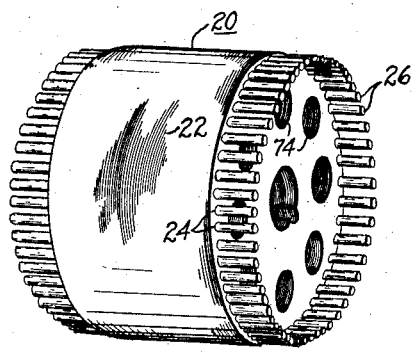
Figure 3:
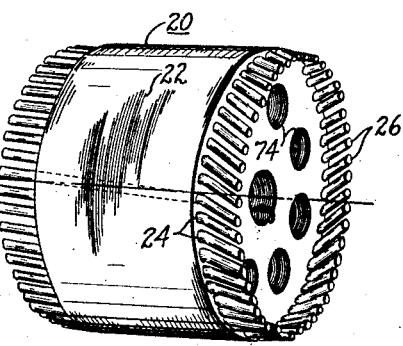

Referring to the drawings, and more particularly to Figs. 1 to 5 inclusive, a rotor core 20, which may consist of laminations 22, is provided with a plurality of equiangularly spaced and concentrically disposed holes 24 into which straight conductors 26 are inserted in such manner that equal lengths thereof project from both core ends as shown in Fig. 2. In order to obtain a current path of least resistance through the conductors, they are preferably made of copper or equally good conductive material. The conductors 26 may be cut to proper length prior to their insertion into the core. However, a more efficient method is diagrammatically illustrated in Fig. 1 and contemplates the severance of a proper length of conductor wire from a supply wire 28 after the leading end of said supply wire has been guided through a hole 24 of the core. To that end, the core laminations are compressed at both ends by two members 30 and 32 which are rotatable coaxially of the core. Member 32 is provided with a plurality of holes 34 which are congruent with the core holes 24. Consequently, all holes 34 of member 32 form a continuation of the core holes 24 when at least two holes of core and member register. Member 32 is preferably of hardened steel so that the edges 36, formed by the merger of the holes 34 and the end face 38 of said member, may be used as shearing edges which cooperate with a stationary shear member 40, carried by any suitable, stationary structure 42. The stationary shear member 40 is provided with a hole 44 of substantially the same diameter as those of member 32 and is in alignment with the circle on which the holes 34 of member 32 are arranged. The clamped assembly, consisting of rotor 20 and members 30 and 32, is rotated until a continuous hole 24, 34 thereof is in alignment with hole 44 of shear member 40, whereupon the leading end of the supply wire 28 is in any suitable manner advanced or fed in the direction of arrow 48 from the stationary shear member 40 into said aligned hole 24, 34 until a length of wire projects beyond the left end of the core in Fig. 1 which is substantially equal to the thickness of member 32. After the supply wire 28 has thus been advanced through the core, the clamped assembly is in any suitable manner indexed an angular distance which is equal to that between two consecutive holes 24, 34 of rotor 20 and member 32, respectively, so that at the conclusion of the indexing operation, the consecutive hole 24, 34 is in alignment with the hole 44 of the stationary shear member 40, ready to receive the subsequently advanced wire 28. During an initial cycle of the indexing operation, an edge 36 of member 32 and the stationary shear member 40 cooperate to sever from the supply wire 28 a conductor 26 as can be readily understood. Thus, by alternately indexing the clamped assembly and feeding the supply wire 28 therethrough, all holes 24 of rotor 20 receive straight conductors 26.

To render longitudinal escape of the conductor pins 26 from the loosely stacked core laminae difficult, member 30 is provided with a slightly frustro-conical surface 50 against which the leading end of the supply wire 28 is fed and thereby slightly bent outwardly prior to the severance of a conductor from said supply wire. The slightly bent conductor ends are instrumental in retaining the otherwise loosely assembled conductors within the core 20 and greatly facilitate handling of the loose rotor assembly, shown in Fig. 2, until the conductor ends are properly anchored to the core by the following operation.

Figure 4:
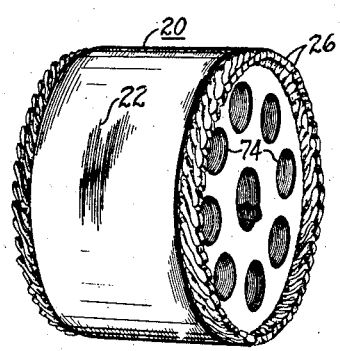
Figure 5:
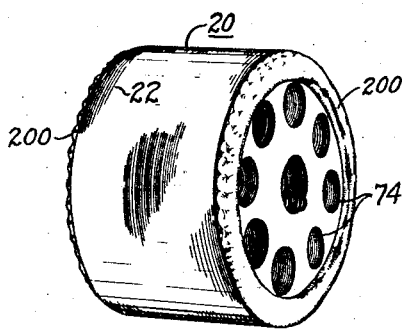
Figure 11:
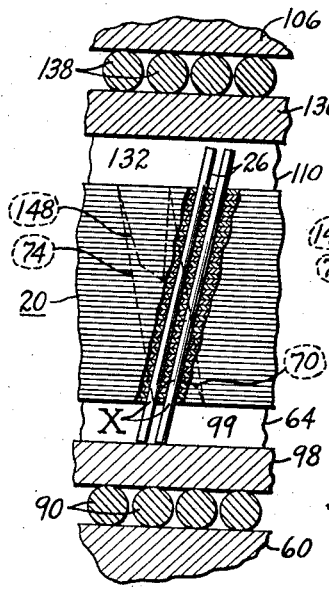
Figure 12:
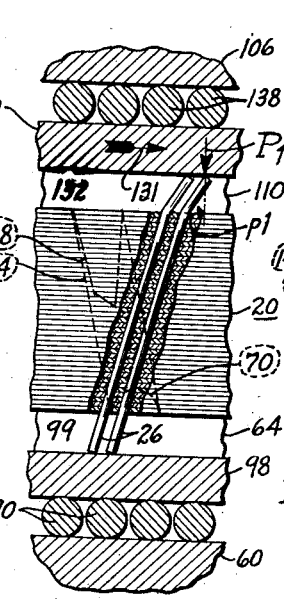
Figure 13:
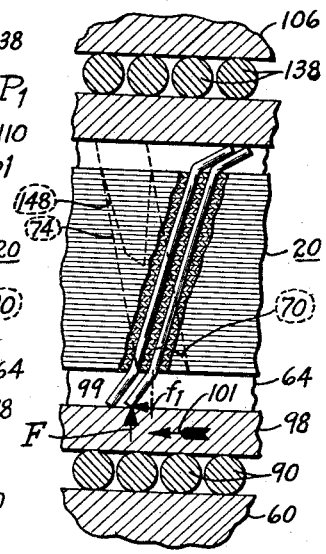
Figure 14:
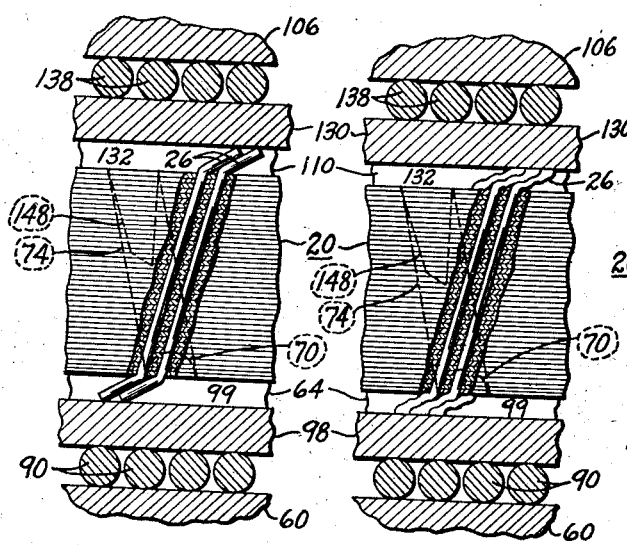
Figure 15:
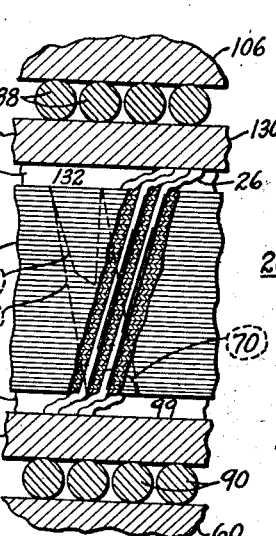

In Figs. 6 to 10 inclusive, there is shown structure which may be used in anchoring the loose conductors 26 to the core 20. This structure incorporates a stationary bed 60, having a recess 62, movably receiving a core support 64 against which an end surface 66 of the core rests. This support 64 is of such diameter that it will just fit into the annular space within the projecting conductor ends. Support 64 is also splined at 68 to base 60 so as to allow longitudinal movement of said support, but no rotation relative to base 60. One or more locating pins 70 project beyond the carrying surface 72 of support 64 and are adapted to register with weight-reducing and ventilation-affording openings 74 of core 20. Base 60 also provides a cylinder 76, receiving an integral plunger 78 of the support 64, said plunger being provided with an annular shoulder 80 which is normally in engagement with an annular stop 82 of base 60, due to the fact that fluid pressure is permanently admitted to cylinder 76. The small margin 66a of the rotor end surface 66, which extends from the periphery of the rotor to the adjacent conductor ends, is resting on a narrow annular shoulder 84 of a strip-member 86 which is guided for movement coaxially of the support 64 by a member 88 which is journaled on said support and rests on a circular anti-friction bearing 90 on top of base 60. Member 86 is provided with an annular shoulder 92 which is normally forced into engagement with an annular stop 94 of member 88 by means of a plurality of compression springs 96, interposed between the members 86 and 88. Each one of these members 86, 88 may rotate relative to each other as well as relative to the support 64, as can be readily understood. The inner sleeve 98 of member 88 extends adjacent the nearest conductor ends of a supported rotor and forms together with member 86 and support 64 an annular groove 99 into which said conductor ends project. Mounted on base 60 and suitably spaced therefrom by columns 100 is a cylinder structure 102, slidably receiving the ram 104 of a carrier 106 which is recessed at 108 and slidably receives a clamping member 110 in coaxial alignment with support 64. This clamping member is of substantially the same diameter as the support 64 and, therefore, just fits into the annular space within the adjacent conductor ends. Member 110 is splined at 112 to the carrier 106 and has an integral plunger 114 which is received in a cylinder 116, provided by the die carrier 106. The carrier 106 is provided with an annular shoulder 118 on which rests the annular shoulder 120 of a strip-member 122, having a narrow annular shoulder 124, which is adapted to engage the narrow margin of the adjacent core end surface 126, extending from the core periphery to the adjacent conductor ends. A sleeve 130 is journaled on the clamping member 110 and forms together with the latter and with member 122 an annular groove 132 which is in alignment with the annular row of adjacent conductor ends. Compression springs 134 normally force member 122 into the lowermost position shown in Fig. 6. Member 110 is also provided with an annular shoulder 136, normally resting on the flange 128 of sleeve 130 which is journaled on said member 110. A circular anti-friction bearing 138 is interposed between the carrier 106 and the sleeve 130 in order to permit rotation of said sleeve relative to the carrier without undue frictional resistance. Cylinder 116 may be in permanent communication with any suitable source of fluid pressure for reasons to be explained later. A suitable conduit 140 provides communication between one side 142 of cylinder 102 and a suitable supply of fluid pressure. Another conduit 144 provides communication between the other side 146 of cylinder 102 and a suitable supply of fluid pressure. Member 110 carries one or more skewing pins 148, having an inclined surface 150 merging into a differently inclined surface 152. These surfaces 150, 152 of a skewing pin 148 are adapted to cooperate with a core hole 74 in order angularly to displace the laminae of the core relative to each other, thereby to skew the conductors which extend therethrough. In order that the skewing pin or pins 148 will always be in alignment with a hole or holes 74 of a properly located core 20 on the support 64, the die carrier 106 is also non-rotatable relative to the lower support 64, in that said carrier is provided with ears 154 through which the columns 100 pass. The operator places a loosely assembled rotor on the support 64 with the slightly bent conductor ends facing toward the upper carrier 106 in order to prevent the conductors from gravitating from the core 20. The operator may also initiate the skewing of the conductors to a considerable extent by twisting the upper laminae of the core in the direction in which the skewing is to take place, so that the surface 150 of the skewing pin or pins 148 is solely relied on to complete the skewing of the conductors. By manipulation of any suitable controller such as a valve (not shown), fluid pressure is admitted to cylinder side 142, causing the carrier 106 and the parts carried thereby to descend into the position shown in Fig. 7 against the tendency of permanent fluid pressure in the other cylinder side 146 to force the ram 104 of the carrier into the uppermost position shown in Fig. 6. During such descent of the carrier 106, the skewing pin or pins 148 will first contact a core opening or openings 74 and substantially finish the skewing by the time member 110 engages the loosely stacked laminations of the core 20 as shown in Fig. 7. Continued descent of the carrier results in compression or compacting of the core laminations by the cooperating floating support 64 and member 110, whereby the latter will first yield after the laminations are compacted to an extent, determined by the fluid pressure in cylinder 116, the fluid pressure in cylinder 76 being under greater pressure than that in cylinder 116. During such compacting of the core laminations, sleeve 130 moves into engagement with the adjacent conductor ends and starts to bend the same. In this connection reference is had to Figs. 11 and 12, the illustrated operations of which take place during and immediately after the compacting of the core laminations. During the skewing, i. e. prior to the compacting of the laminations, the conductors 26 are rocked about the points X in Fig. 11 since the lowermost lamination is held perfectly stationary by the non-rotatable locating pin or pins 70 of the support 64. When the compacting of the core laminations is concluded, member 110 yields relative to the sleeve 130 which then engages the adjacent conductor ends and exerts a thrust P1 thereagainst which is directed parallel to the rotor axis and has a component $p1$ which has a direct bending action on the adjacent conductor ends as illustrated in Fig. 12. The slightly pre-bent conductor ends at the core top in Fig. 11 resist to some extent such shifting of the conductors relative to the core as would result in bending of the lower conductor ends by the adjacent ram 98. However, this factor alone does not satisfactorily explain why the upper conductor ends will bend under the imparted thrust before the lower conductor ends start to bend. It is believed that the considerable static friction between the skewed conductors and the compressed core laminations is a more decisive factor in the bending of the upper conductor ends prior to the bending of the lower conductor ends. The considerable static friction between sleeve 130 and adjacent conductor ends at their initial engagement establishes a rotary driving connection therebetween, indicated by arrow 131 in Fig. 12, while the conductor ends are bent in the annular groove 132. If sleeve 130 were non-rotatable, the static friction between sleeve 130 and the engaged conductor ends might result in knicking or battering down of the latter instead of the uniform bending illustrated in Figs. 3, 8 and 12. These figures show the upper conductor ends in an intermediate state of bending. The bending operation progresses with continued descent of the carrier 106 until the bent conductor ends engage each other in the manner shown in Fig. 13. At substantially this stage of the bending operation the lower-conductor ends will start to bend in a direction opposite to that of the upper conductor ends since sufficient thrust is now transmitted through the engaging, bent conductor ends at the top of the core and the conductors to cause the lower support 64 to yield and permit engagement of the lower conductor ends with the lower bending sleeve 98. The thrust F, imparted by sleeve 98 to the adjacent conductor ends, has a component $f1$ which has a direct bending action on said conductor ends. Furthermore, the considerable static friction between sleeve 98 and adjacent conductor ends at their initial engagement establishes a rotary driving connection therebetween, indicated by arrow 101 in Fig. 13, which prevails during the bending of these lower conductor ends as can be readily understood. Fig. 13 illustrates an intermediate stage in the bending of the lower conductor ends. Continued descent of the carrier 106 and support 64 relative to the sleeve 98 will cause the lower conductor ends to bend into engagement with each other as shown in Figs. 9 and 14. To conclude the bending operation, the pressure on the operating fluid in cylinder side 142 is greatly increased in any suitable manner to ram the conductor ends home, whereby they will be partially deformed and in a sense swedged together as illustrated in Figs. 4, 10 and 15. Cylinder side 142 is now vented in any suitable manner, resulting in return of the carrier 106 and its parts into the home position shown in Fig. 6. The assembly of core and conductors is removed from the support 64 and a new, loose assembly placed thereon for the next operation of the machine structure.

Figure 16:
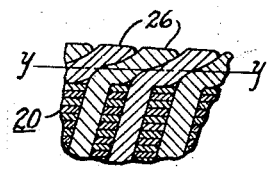
Fig. 16 is a fragmentary, sectional view of a finished rotor.

The swedged conductor ends of the assembly shown in Fig. 4 are finally fused together (see Fig. 5) in any well known, convenient manner such as electric-arc fusing (not illustrated), thereby obtaining a ring 200 on each core end which is integrally connected with all conductors in the manner illustrated in Fig. 16.

As compared to a rotor assembled by any of a number of generally practised methods, the present rotor incorporates several important advantages to be stated hereafter. These advantages are the direct result of the method by which the present rotor is assembled.

Perhaps the most important advantage resides in the firm anchorage of the conductors in the rotor core. Obviously, the bending of the conductor ends against the core ends results in a permanent stress in the conductors which has to be overcome before the conductors can become loose. That the conductors will be disturbed in their permanently stressed condition under any operating condition of the rotor is highly improbable, wherefore the permanency of the firm anchorage of the conductors is assured.

This advantage is of even greater importance where the core is made up of laminations which require a considerable clamping force by the conductors in order to retain the necessary compactness.

The bending of the conductor ends in opposite directions has the added advantage of substantially distributing the permanent stress throughout the cross-section of the conductors, thereby preventing undesirable localized stresses in the conductors.

Figure 17:
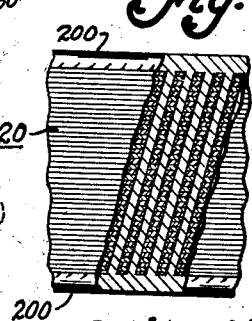
Fig. 17 is an enlarged, fragmentary section of the rotor.

The swedging of the conductor ends, which takes place immediately after their bending and while the core laminations are still compressed, results in deformation of said conductor ends to such an extent that they are effectively riveted against the core ends in the fashion shown in Fig. 17. This prevents the permanently stressed conductors from contracting and thereby drawing the bent ends slightly into the rotor. The subsequent fusion of the swedged conductor ends is preferably terminated substantially at the dot-and-dash line $y-y$ in Fig. 17, i. e. short of the core-end engaging surfaces of the conductor ends, thus preventing contraction of the permanently stressed conductors even during and after fusion.

By fusing the bent conductor ends into integral connectors, the conductors are ideally electrically connected. Moreover, the integral end connectors will most effectively resist the tendency of the compacted core laminations to become loose and prevent shifting of skewed conductors in a laminated core in any direction.

Another considerable item in favor of the present rotor is its low cost of manufacture due to the limited number of different parts of the rotor.

While the described method is most advantageous in connection with straight bar conductors, it is to be understood that this same method may be advantageously applied in connection with conductors having one end preformed to afford anchorage on a rotor core. The other, straight ends of these conductors may be anchored by the present method with great advantage to the rotor. Consequently, such application of the present method falls fully within the scope of the present invention.

While the embodiment of the present invention as herein disclosed, constitutes a preferred form, it is to be understood that other forms might be adopted, all coming within the scope of the claims which follow.

What is claimed is as follows:

1. In the method of making rotors, the steps of advancing the leading end of a conductor wire through one of a series of holes in a laminated rotor core, bending slightly the leading end of the conductor after it passes through the core, severing from the advanced supply wire a length which projects through the core, repeating the preceding steps until each hole holds a conductor, bending all the conductors against each other to place a permanent stress on the conductors to hold the laminae together, ramming the bent ends against the end of the core and above each other to maintain the stress on the conductors, and then fusing the ends beyond the core ends into an integral end ring.

2. In a method of making rotors, the steps of inserting a conductor wire through one of a series of holes in a laminated core, slightly bending the leading end of the conductor after it passes through the core, severing from the advanced supply wire a length which extends through the core, repeating the preceding steps until each hole holds a conductor, twisting the laminations to skew the conductors, compressing the laminations, bending the conductors to place a permanent stress on the conductors to hold the laminations in their compressed relation, deforming the cross-sectional shape of the bent conductor ends by swedging them against the core ends and above each other, and then fusing the swedged portions beyond the core ends to form an integral end ring.

3. The method of manufacturing rotors for dynamoelectric machines which includes the steps of assembling bar conductors with a core which comprises a stack of loosely assembled laminae, the conductor bars being so associated with the core that ends of the bars project beyond the ends of the core, then skewing the laminae and conductors a definite and predetermined amount, compressing the laminae subsequent to the skewing operation and while in skewed condition, and then, while maintaining the laminae in compressed condition, applying pressure to the protruding conductor ends in order to bend said ends against the adjacent core ends and into contact engagement with each other.

4. The method of manufacturing rotors for dynamoelectric machines which includes the steps of assembling bar conductors with a core which comprises a stack of loosely assembled laminae, the conductor bars being so associated with the core that ends of the bars project beyond the ends of the core, then skewing the laminae and thereafter so engaging the laminae as to hold said laminae in their predetermined skewed position, and while holding the laminae in such position, applying pressure to the protruding conductor ends in order to bend said ends against the adjacent core ends and into contact engagement with each other.

GEORGE W. ELSEY.